Patented Aug. 30, 1932

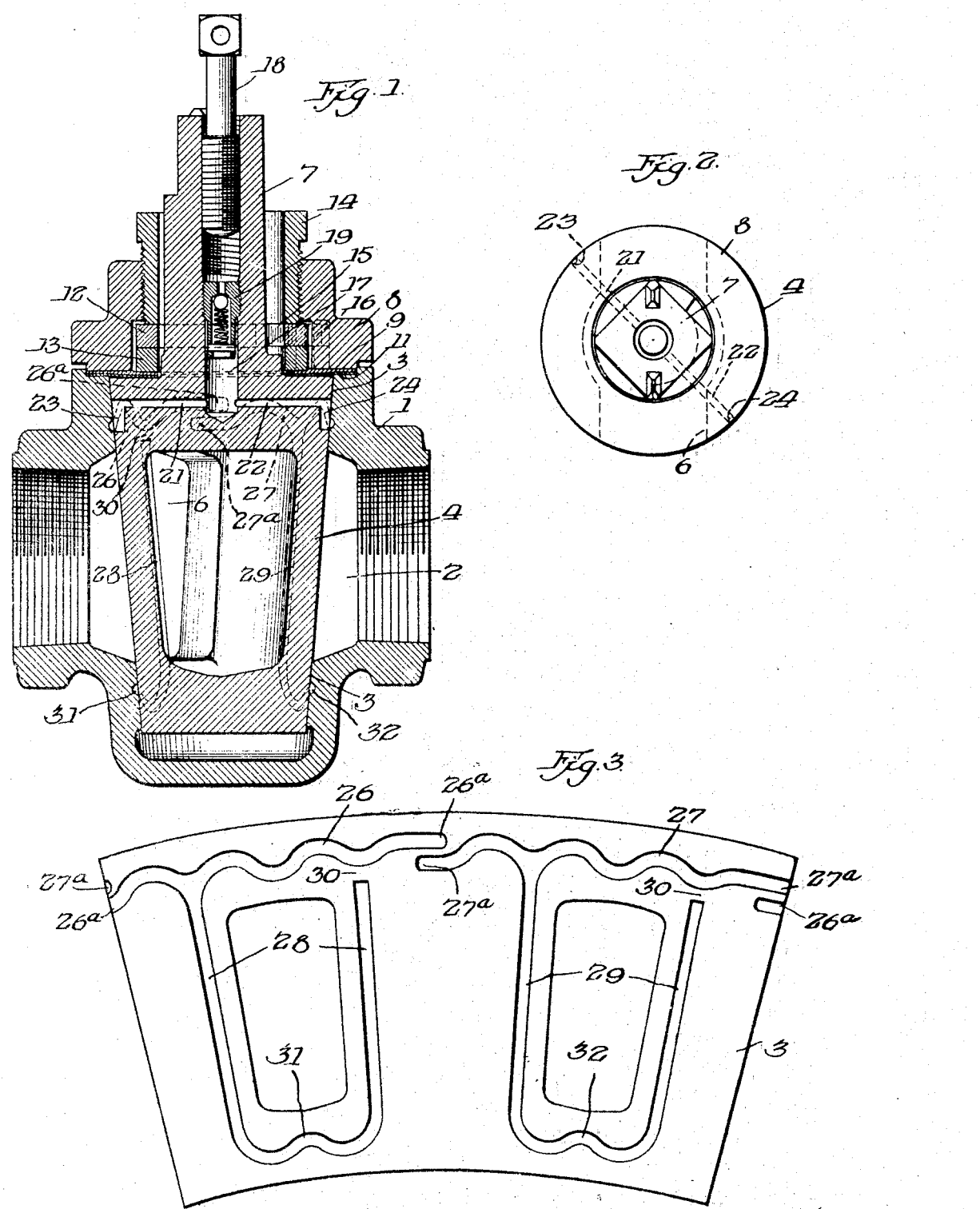

1,875,302

UNITED STATES PATENT OFFICE

VICTOR E. FLODIN, OF OAK PARK, ILLINOIS, ASSIGNOR TO CRANE CO., OF CHICAGO, ILLINOIS, A CORPORATION OF ILLINOIS

LUBRICATED AND SEALED PLUG VALVE

Application filed December 5, 1931. Serial No. 579,168.

This invention relates to lubricated and sealed plug valves generally known as cocks.

For many uses a cock is preferable to a valve due to its simplicity and relatively large seating areas. A cock, however, has presented two major problems, that of lubricating the cock so that it may be readily turned after long periods of being in one position, and that of insuring a positive shut off when the cock is in closed position. Many attempts have been made to lubricate the seating surfaces of a cock but it has been found that the matter of lubricating a cock involves complications, particularly when the means of lubrication is also utilized to seal the cock to cause it to be absolutely tight when in closed position.

It is a relatively simple matter to provide lubricant grooves between the seating surfaces of the cock body and plug therein and to place one or more lubricant grooves around the passage or port through the body when the plug is in closed position to form a seal around this opening. However, if the lubricant grooves are placed where they will provide the most efficient seal, they are subject to the pressure of the fluid within the line when the plug is rotated from open to closed position. In some instances, the fluid will wash or dissolve out the lubricant throughout the entire system of lubricating grooves. This is particularly true where the grooves are arranged to form a complete seal around both ends of the passage through the body and are connected for communication by circumferential grooves around one or both ends of the plug.

It is the purpose of this invention to provide means for thoroughly lubricating a plug which will, at the same time, provide a lubricant seal around one or both ends of the passage through the body when the plug is in open or closed position or both, and at the same time to so arrange the lubricant grooves and ducts as to prevent the fluid in the line from washing or dissolving out the lubricant in the entire system and thereby eliminate leaking and sticking of the cock plug.

According to this invention, a lubricant groove or channel is provided in the seating surfaces between the body and plug around the passage through the body at each end thereof which passages are in communication with a single interrupted or two spaced circumferential grooves so arranged that they do not constitute a continuous circuit which will permit circulation of the line fluid therethrough, but on the contrary, are arranged to provide only one or more closed or "blind" circuits. The grooves are supplied with lubricant from one or more sources of lubricant under pressure.

A better understanding of this invention will be had from the following description given in connection with the drawing illustrating one embodiment of this invention and in which:

Fig. 1 is a longitudinal vertical section through the center of a cock constructed in accordance with this invention, the cock being shown in throttling position.

Fig. 2 is a plan view of the cock plug, and

Fig. 3 is a development of the interior seating surface of the body illustrating the development of the lubricating grooves therein.

Referring to the drawing, the illustrated cock comprises a body 1 having a passage 2 therethrough, the ends of which are threaded to receive pipe connections and also having a tapered plug chamber or seat 3 arranged transversely to the passage 2. Seated within the seat 3 of the body is a correspondingly tapered plug 4 having a port 6 therethrough and terminating in an upwardly extending stem 7. The plug is held in position by a bonnet 8 which may be secured to the body by the usual stud screws, not shown. Clamped between the bonnet and body are gaskets 9 and 11. Within the bonnet and surrounding the stem in a thrust washer 12 and a collar 13, the latter two being held in position by an adjustable nut 14 threaded into the bonnet. Washer 12 is provided with inwardly and outwardly projecting lugs 15 and 16 respectively which cooperate with recesses formed in the stem and bonnet to limit rotation of the plug to 90°.

In order to lubricate the cock the stem 7 in the illustrated embodiment is bored centrally to provide a lubricant reservoir 17, the upper end of which is threaded to receive a compressor 18 by means of which the lubricant may be fed under pressure. In the upper end of the reservoir is a removable check valve unit 19 which prevents line pressure from escaping when lubricant is being replaced. At its lower end, reservoir 17 communicates with a pair of lateral ducts 21 and 22 which extend outwardly to the seating surface of the plug and terminate in enlarged ends 23 and 24 respectively for reasons which will later be described.

For lubricating the seating surfaces of the plug and body, the seating surface of the body is provided with an undulated circumferential lubricant groove having two diametrically opposite portions 26 and 27 which together surround the upper seating surface of the port and plug therein. The ends of the two portions overlap as at 26ª and 27ª but are spaced from each other at these overlapping regions to prevent communication from channel 26 to channel 27. The annular circumferential groove may be considered as one interrupted groove or two diametrically opposite disconnected grooves substantially 180° in length. The seating surface of the body is further provided with four longitudinal grooves two indicated by 28 and two indicated by 29. Grooves 28 lie one upon each side of the passage through the body and at one end of the body while grooves 29 lie one upon each side of the passage through the body at the other end thereof. One groove 28 and one groove 29 terminate at their upper ends in the upper circumferential groove portions 26 and 27 respectively but not with both grooves 26 and 27 whereas one of each of the pairs of grooves 28 and 29 stops short of the upper groove as at 30 so as not to be in communication therewith. The shortened grooves 28 and 29 are preferably those which are exposed to the line pressure when the cock plug is in throttling position, thus forming a blind exposed groove. Grooves 28 and grooves 29 are joined at their lower ends by undulated connecting grooves 31 and 32 respectively which, if desired, may be continued around substantially the entire surface in the manner of grooves 26 and 27.

The foregoing arrangement of lubricating grooves provides two diametrically opposite blind lubricant grooves substantially surrounding each end of the passage through the body. The enlarged ends 23 and 24 of ducts 21 and 22 are equal in length to the amplitude of the undulated grooves 26 and 27 and communicate with these grooves respectively. Ducts 21 and 22 are so disposed that duct 21 will always be in communication with groove 26 throughout the entire 90° rotation of the plug but will never be in communication with groove 27 at any position of the plug. Likewise, duct 22 is so disposed that it will always be in communication with groove 27 but never in communication with groove 26. In this manner, lubricant under pressure may always be supplied to the lubricant grooves at any position of the plug and thus facilitate moving the plug regardless of what position it may be left, yet there is no continuous circuit through grooves, in the seating surface of the plug and body from one side of the plug to the other, and no continuous groove surrounding the passages through the body through which the fluid in the line may circulate and thus completely wash out the lubricant in all the grooves. In the illustrated embodiment lubricant is inserted between the seating surfaces of the body and the plug by lubricating grooves formed wholly in the seating surface of the body, whereas these grooves may be provided in either member as desired.

From the foregoing description it will be apparent that in a cock constructed as heretofore described, substantially the entire seating surfaces between the plug and body may be lubricated by lubricant under pressure at all times regardless of the position of the plug. Furthermore, a substantial lubricant seal is provided around the passage through the body at each end of the body where the passage intersects the seating surface thereof and that the lubricant grooves are arranged in such a manner and interrupted so that the line pressure cannot wash out the lubricant and thus destroy seal at both ends of the body.

It is obvious that minor changes may be made in the details of construction of the particular embodiment of this invention illustrated without departing from the spirit and scope of the invention as defined in the following claims.

I claim:

1. In a lubricated and sealed cock, a body having a passage therethrough and a valve chamber transverse to said passage, a plug seated in said chamber and means for lubricating said cock comprising diametrically opposite lubricant grooves in the seating surface of the body and substantially surrounding the passage through the body at each end of the body, means for continuously supplying lubricant under pressure to each of said grooves, and means for preventing communication through said grooves from one to the other.

2. In a lubricated and sealed cock, a body having a passage therethrough and a valve chamber transverse to said passage, a plug seated in said chamber and means for lubricating said cock comprising diametrically opposite lubricant grooves in the seating surface of the body and substantially surrounding the passage through the body at each end of the body, means for continuously supplying lubricant under pressure to each of said grooves, and means for preventing communication through said grooves from one to the other at any position of the plug.

3. In a lubricated and sealed cock, a body having a passage therethrough and a valve chamber transverse to said passage, a plug seated in said chamber and means for lubricating said cock comprising a circumferential lubricant groove in the seating surface of said body and substantially surrounding said plug, said groove being interrupted, and a longitudinal lubricant groove in the seating surface of said body at each side of the passage through said body at one end of the body, said longitudinal groove communicating with said circumferential groove, and means for supplying lubricant under pressure to all of said grooves.

4. In a lubricated and sealed cock, a body having a passage therethrough and a valve chamber transverse to said passage, a plug seated in said chamber, and means for lubricating said cock comprising diametrically opposite circumferential lubricant grooves in the seating surface of the body and terminating in spaced non-communicating overlapping ends, a longitudinal lubricant groove in the seating surface of said body at each side of said passage at one end of the body, said longitudinal grooves communicating with one of said circumferential grooves, and means for supplying lubricant under pressure to all of said grooves.

5. In a lubricated and sealed cock, a body having a passage therethrough and a valve chamber transverse to said passage, a plug seated in said chamber, and means for lubricating said cock comprising diametrically opposite lubricant grooves in the seating surface of the body extending circumferentially of said plug and terminating in spaced non-communicating ends, a longitudinal lubricant groove in the seating surface of said body at each side of the passage through said body at each end of the body, said longitudinal grooves each communicating with one of said circumferential grooves, and means for supplying lubricant under pressure to all of said grooves.

6. In a lubricated and sealed cock, a body having a passage therethrough and a valve chamber transverse to said passage, a plug seated in said chamber, and means for lubricating said cock comprising a circumferential lubricant groove in the seating surface of said body and substantially surrounding said plug, said groove being interrupted at diametrically opposite points, a longitudinal lubricant groove in the seating surface of said body at each side of the passage through said body at one end of said body, said longitudinal grooves communicating with said circumferential groove, and means for supplying lubricant under pressure to all of said grooves.

7. In a lubricated and sealed cock, a body having a passage therethrough and a valve chamber transverse to said passage, a plug seated in said chamber, and means for lubricating the seating surfaces of said plug and body including a lubricant groove substantially surrounding the upper portion of said plug and longitudinal lubricating grooves communicating therewith to substantially surround the passage through the body at each end of the body, means for preventing communication through said grooves between the grooves surrounding the passage at one end of the body and the grooves surrounding the passage at the other end of the body, and means for supplying said grooves with lubricant under pressure.

8. In a lubricated and sealed cock, a body having a passage therethrough and a valve chamber transverse to said passage, a plug seated in said chamber, and means for lubricating the seating surfaces of said plug and body including a groove substantially surrounding the upper portion of said plug and a pair of connected longitudinal grooves co-operating therewith to substantially surround the passage through the body at each end of the body, one end of one of the longitudinal grooves of each pair being in communication with said circumferential groove and the free end of the other of said longitudinal grooves of each pair being disconnected therefrom, means for preventing communication through said grooves between the grooves substantially surrounding the passage at one end of the body and the grooves substantially surrounding the passage at the other end of said body, and means for supplying said grooves with lubricant under pressure.

9. In a lubricated and sealed cock, a body having a passage therethrough and a valve chamber transverse to said passage, a plug seated in said chamber, and means for lubricating the seating surfaces of said plug and body including two diametrically opposite non-communicating lubricant grooves substantially surrounding the upper portion of said plug, an additional lubricant groove at each end of the body one in communication with each of said diametrically opposite grooves and cooperating therewith to substantially surround the passage through the body, a lubricant reservoir in the plug and lateral ducts extending therefrom, one to each of said circumferential grooves, and means for preventing each of said ducts from communicating with the other of said circumferential grooves through said lubricant grooves.

10. In a lubricated and sealed cock, a body having a passage therethrough and a valve chamber transverse to said passage, a plug seated in said chamber and means for lubricating said cock comprising diametrically opposite lubricant grooves in the seating surface of the body and substantially surrounding the passage through the body at each end of the body, said grooves terminating in closed non-communicating ends to prevent circulation therethrough.

11. In a lubricated and sealed cock, a body having a passage therethrough and a valve chamber transverse to said passage, a plug seated in said chamber and means for lubricating the seating surfaces of said plug and body including an undulated lubricant groove in the seating surface of said body substantially surrounding the upper portion of said plug, a lubricant reservoir formed in said plug and a duct therefrom communicating with said circumferential groove, said duct at its point of communication with said circumferential groove being of a width equal to the amplitude of said undulation.

12. In a lubricated and sealed cock, a body having a passage therethrough and a valve chamber transverse to said passage, a plug seated in said chamber, and means for lubricating the seating surfaces of said plug and body including two undulating diametrically opposite non-communicating grooves substantially in said body and surrounding the upper portion of said plug, and additional groove in communication with each of said diametrically opposite grooves at one end only of said additional grooves and cooperating therewith to substantially surround the passage through the body at each end thereof, a lubricant reservoir in the plug, and lateral ducts extending therefrom, one to each of said circumferential grooves, being in communication with said circumferential grooves at all positions of said plug.

13. In a lubricated sealed cock, a body having a passage therethrough and a valve chamber transverse to said passage and provided with a seating surface, a plug seated in said chamber and provided with a cooperating seating surface, and means for lubricating said cock comprising diametrically opposite lubricant grooves in one of said seating surfaces and substantially surrounding the passage through the body at each end of the body, means for continuously supplying lubricant under pressure to each of said grooves, and means for preventing communication through said grooves from one to the other.

In witness of the foregoing I affix my signature.

VICTOR E. FLODIN.